United States Patent
Colvin et al.

(10) Patent No.: US 6,322,932 B1
(45) Date of Patent: *Nov. 27, 2001

(54) HOLOGRAPHIC PROCESS AND MEDIA THEREFOR

(75) Inventors: Vicki L. Colvin, Springfield; Kevin Richard Curtis, Summit; Alexander Lowe Harris, Maplewood; Howard Edan Katz, Summit; Marcia Lea Schilling, Basking Ridge; William Larry Wilson, Somerville, all of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/698,511

(22) Filed: Aug. 15, 1996

(51) Int. Cl.$^7$ ................ G03H 1/02; G03H 1/26
(52) U.S. Cl. ............ 430/2; 430/1; 359/1; 359/3; 359/4; 359/10; 359/11; 359/28
(58) Field of Search ............... 430/1, 2, 945, 430/19; 359/1, 3, 4, 10, 11, 2, 28

(56) References Cited

U.S. PATENT DOCUMENTS

| | | | |
|---|---|---|---|
| 3,560,210 | 2/1971 | Grobin, Jr. ................ | 430/1 |
| 3,612,641 | 10/1971 | Eaglesfield ................ | 359/11 |
| 3,799,642 | 3/1974 | Phillips et al. ................ | 350/3.5 |
| 3,894,756 | * 7/1975 | Ward ................ | 359/2 |
| 4,312,559 | 1/1982 | Kojima et al. ................ | 359/22 |
| 4,998,236 | 3/1991 | Henshaw ................ | 369/103 |
| 5,325,324 | * 6/1994 | Rentzepis et al. ................ | 365/127 |
| 5,483,365 | * 1/1996 | Pu et al. ................ | 359/11 |
| 5,508,829 | 4/1996 | Freeouf ................ | 359/3 |
| 5,543,251 | 8/1996 | Taylor ................ | 430/1 |
| 5,640,256 | * 6/1997 | DeVreet et al. ................ | 430/1 |
| 5,719,691 | * 2/1998 | Curtis et al. ................ | 359/11 |

FOREIGN PATENT DOCUMENTS

| | | | |
|---|---|---|---|
| 0585941 | 3/1994 | (EP) ................ | 430/2 |
| 2570517 | 9/1984 | (FR) ................ | G03C/1/68 |

OTHER PUBLICATIONS

Caulfield, H.J. et al., "The Applications of Holography" (1970) pp. 48 and 49, 1970.*

Caulfield et al., "Application of Holography" (1970) pp 30–33.

Nordin et al., "Photopolymer–based . . . " Opt. Lett., 17(23) pp. 1709–1711 (Dec. 1992).

Stankus et al., "Electric–field switchable . . . " Opt. Lett., 19(18) pp. 1480–1482 (Sep. 1994).

Curtis et al., "Method for holographic . . . " Opt. Lett., 19(13) pp. 993–994 (Jul. 1994).

Kawabata et al., "Photopolymer system . . . " Appl. Opt., 33(11) pp. 2152–2156 (Apr. 1994).

LaMacchia, J.T. et al., "Coded multiple exposure holograms", Appl. Opt., vol. 7(1), pp. 91–94, Jan. 1968.*

Collier, R.J., et al., "Multicolor imaging from holograms formed on two dimensional media", Appl. Opt., vol. 6(6) pp. 1091–1095, Jun. 1967.*

(List continued on next page.)

Primary Examiner—Martin Angebranndt

(57) ABSTRACT

High storage densities using a holographic system are achievable using a stratified medium while maintaining a relatively high selectivity upon reconstruction of the stored images. Such combination of high density and high selectivity is achievable by employing a stratified medium and a recording process where selectivity does not vary with recording thickness.

16 Claims, 1 Drawing Sheet

OTHER PUBLICATIONS

Krile, T.F. et al., "Holographic representations of space variant systems using phase coded reference beams", Appl. Opt., vol. 16(12) pp. 3131–3135, Dec. 1977.*

Jones, M.I., et al., "Multiplex hologram representations of space variant optical systems using ground glas encoded reference beams", Appl. Opt., vol. 21(7) pp. 1291–1297, Apr. 1982.*

"Photopolymer–based stratified volume holographic optical elements" by Gregory P. Nordin and Armand R Tanguay, Jr., Optics Letters, vol. 17, No. 23, pp. 1709–1711.

"Storage of 500 high–resolution holograms in a $LiNbO_3$ crystal" by F. H. Mok, M. C. Tackitt, and H. M. Stoll, Optics Letters, vol. 16, Nol 8, pp. 605–607.

\* cited by examiner

HOLOGRAPHIC PROCESS AND MEDIA THEREFOR

BACKGROUND OF THE INVENTION

1. Field of the Invention

This invention relates to optical storage and, in particular, to optical storage achieved employing holography.

2. Art Background

A variety of approaches have been suggested for the storage of information. Of these approaches, optical storage has long been investigated. One optical approach, holography, although potentially offering high density storage, i.e., greater than 100 bits/$\mu m^2$, has never satisfied expectations. In the holographic storage approach, light carrying the information, such as a digital video image, digital data, text, or audio, is caused to intersect a reference light beam in the volume of a recording medium, such as lithium niobate. The resulting interference pattern produced by the interaction of the reference and information light is denominated a hologram. In common practices, holograms are recorded in the medium as a corresponding pattern of changes in a property of the medium, e.g. refractive index or absorption. The hologram is reconstructed by interrogating the medium with the reference light and observing the light, e.g. diffracted light, after its interaction with the medium.

The number of such holograms per unit volume that can be stored in, and ultimately reconstructed from, the medium is a measure of information storage density. The selectivity, i.e. the change in angle, wavelength, position, or other physical parameter required before a new hologram can be recorded and read independently, of the writing/reconstruction technique determines the useable storage density. A typical approach for reconstructing one recorded hologram without interference from another, i.e., for providing selectivity, is denominated Bragg selectivity. In one particular variant of such approach, each hologram is written using a different angle between the information and reference light and then reconstructed at the corresponding reference angle. Generally, the selectivity of such Bragg techniques requires a change of at least $\Delta\theta=\lambda/L$ degrees between adjacent holograms to allow independent reconstruction (where $\lambda$ is the wavelength of the reference light and L is the thickness of the region of intersection between the reference and signal light.) Other methods for providing selectivity are peristrophic and fractal multiplexing. See Curtis et al., *Optics Letters*, 19 (13), 993 (1994), Psaltis et al., *SPIE Proceedings*, 963 70: 1988 ICO Topical Meeting on Optical Computing Toulon. respectively, for a description of these techniques. Each technique depends on a change of orientation between the reference beam, signal beam, and/or the recording medium.

Although selectivity is one primary factor affecting signal to noise ratio of the reconstructed hologram, and the storage density of the memory, it is not the only factor. A second primary factor is the total refractive index (or other medium property being relied upon) change producible in the medium. The total refractive index change is, in turn, dependent on the volume of the medium and the absolute value of the refractive index change induced in the composition. Since, for a given composition the maximum possible refractive index change is fixed, increased storage capacity requires an increased volume of the recording medium. Similarly, for a given recording technique selectivity, and thus, storage per unit volume (i.e., density) is again fixed, and thus, increased storage requires increased volume.

To increase density and selectivity for the Bragg approach, holograms have been written in relatively thick materials, i.e., materials having a thickness greater than approximately 1 mm. Nevertheless, a monolithic, thick medium with suitable properties has generally proven difficult to achieve in practice. Such medium should be flat, have a maximum refractive index perturbation, $\Delta n$, greater than 0.0001, have an absorption coefficient less than 2 at the writing wavelength with a thickness deviation typically no greater than approximately 100 $\mu m$, have less than 2% shrinkage on exposure, have relatively small thermal coefficient of expansion (less than 500 ppm), and have a sensitivity of greater than $10^{-3}$ per joule. Satisfaction of all these criteria with a single, thick, monolithic structure is extremely difficult to achieve. Attempts have been made to write holograms in stratified structures to effect a thick medium by using a multiplicity of thin layers. Such structures typically include a transparent region, e.g., a glass plate, where no recording occurs (an inactive region) alternating with regions responsive to the recording light (active regions). Such stratified structures have been shown useful for many applications involving the writing and reconstruction of a single holographic optical element. (See, for example, Nordin and Tanguay, *Optical Letters*, 17, 1709 (1992) and Nordin, et al., *Journal of the Optical Society of America A*, 9, 2206 (1992).)

The formation and reconstruction of a multitude of holographic structures in a stratified medium, however, has been met with significant obstacles. In such attempts, a Bragg selectivity approach has been employed. The attempted use of Bragg holography in a stratified medium, however, results in unacceptable signal to noise upon reconstruction of holograms that have been stored as close as the total active thickness would, in theory, allow in a correspondingly thick medium that is not stratified. That is, crosstalk noise (noise from other multiplexed holograms) has limited the usefulness of stratified samples with Bragg approaches. The resulting lack of selectivity improvement severely limits the density of stored information. This phenomenon is demonstrated in Stankus, et al., *Optics Letters*, 19, 1480 (1994). As shown in FIG. 3 of that article, for each hologram, numerous angles will yield some reconstructed output causing undesirable interference. As noted in the Stankus article, the only apparent approach for avoiding such problems is to employ a stratified medium where the active regions are at least 15 times thicker than the inactive regions. Clearly, such approach requires a structure which is either mechanically unstable or one that, because of the thickness of its active regions, yields the same difficulties in producing flatness, uniformity, and the other characteristics required of the active medium.

Thus, a medium and a method of recordation and reconstruction in such medium that yields resolvable high information storage, has been an elusive goal.

SUMMARY OF THE INVENTION

The applicants have found a stratified medium is employable providing the writing technique used to record has specific invariant characteristics. That is, a technique should be employed such that the selectivity essentially does not vary, i.e. varies less than 5% over a 10% change of medium thickness for a single active region. This determination should be made when the overlapping area of signal and reference beams is greater than the medium thickness.

For example, if the recordation procedure (correlation multiplex holography) described in co-pending U.S. patent application Ser. No. 08/435,705, filed May 5, 1995 (Curtis-Wilson 2-6) now U.S. Pat. No. 5,719,691, which is hereby incorporated by reference, is employed—an approach having the required characteristics—a total storage of approximately 200 bits/µm in a total active medium thickness of 2 mm is obtainable for a stratified medium.

Briefly, that technique is defined as a holographic process in which an array of individual partially overlapping holograms is recorded in a recording medium by recording each individual hologram at an individual location by interfering a reference beam and a signal beam, and by moving the medium and the beams relative to each other to locate each individual hologram, and further wherein the reference beam used for recording the individual holograms of the array, as measured at the position of interference, is a phase beam of unchanging content containing a multiplicity of rays of non-uniform angle of incidence and of non-uniform phase. The reference beam has a position-to-position self-similarity such that its auto-correlation function has a value which is sufficiently small to enable selection of individual holograms of the array.

DETAILED DESCRIPTION

As discussed, the ability to write and reconstruct a large number of holograms, i.e., greater than approximately (L/5λ) where L is the thickness of a single active layer, and λ is the wavelength of light used, depends on employing a technique with invariant selectivity characteristics. (A stratified medium is one having at least two active regions where the active regions are separated by an inactive region and where the median thickness of the active regions, as compared to the inactive regions, is no greater than 10 to 1 advantageously no greater than 5:1.)

As previously discussed, stratified media have alternating active and inactive regions. For active regions having mechanical stability such as crystalline layers, e.g lithium niobate layers, at least 200 µm thick, it is possible for the active region to be the outermost layer. However, for many active media and especially for polymeric active media, the outermost layers are generally inactive, and such outermost inactive layers are denominated substrates, 1 in FIG. 1. The inactive region(s) 2 and/or the substrate(s), 1, typically provide mechanical stability for this stratified medium. Inactive regions should have 1) observed strain as measured by a level of birefringence less than 1 part in $10^3$, 2) a refractive index that deviates less than 20% from the unexposed active layers, and 3) an optical absorption less than 10% at the reference light average wavelength. Generally, display glasses such as Corning 7059, a display glass sold by Corning, satisfy all these criteria. However, other materials such as polymers are acceptable. Substrates, generally in addition to the requirements for inactive layers, should have an antireflection coating for the used wavelength, on the order of one wave for 1 cm$^2$ of area flatness, a birefringence less than 1 part in $10^4$, and a thickness of 500 µm to 4 mm (preferably 500 µm to 2 mm) In addition, it is useful to coat this substrate with an antireflective layer for the reference wavelength spectrum used. Typically, dimensions for the inactive region and the substrate region are respectively between 10 µm and 3 mm and between 500 µm and 3 mm in thickness. Thicknesses greater than 3 mm are undesirable between layers because they make the stack overall thickness too large, while thicknesses less than 10 µm lead typically to mechanical instability and a difficulty of fabrication. Although not a limitation on the invention, typically it is desirable to maintain a total thickness less than 5 mm so that compatibility with current optical disk technology is easily achievable. Size of the gross dimension of the substrate is also not a limitation on the invention, but practically should be typically in the range to allow compatibility with generally obtainable optical components such as 5¼ inch disks.

Figure 1:
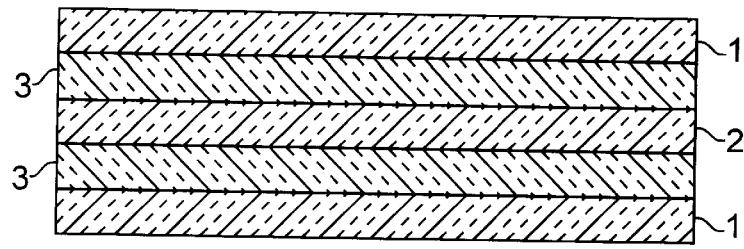
FIG. 1 is illustrative of stratified media.

The active region, for example 3 in FIG. 1, should also have the strain uniformity properties described for the inactive region with a total media absorption coefficient less than 2. Additionally, the active regions should be sensitive, i.e., undergo a refractive index change (or other property change) upon application of the reference light. For example, the active region includes a photochromic material or a photorefractive material such as lithium niobate or a photorefractive polymer. Typically, sensitivities in the range of $10^{-3}$ per joule are desirable. (Sensitivity is defined as refractive index changes per joule per cm$^2$ of applied energy.) Sensitivities less than $10^{-5}$ per joule yield systems which record either very slowly or require too much laser power. Sensitivities greater than $10^{-2}$ are typically not a limitation on the invention, but possibly lead to media which must be carefully stored and processed to avoid inadvertent exposure.

Generally, the dynamic range of the medium should have a M number greater than 10. M number is related to the quantity $\Delta n_{max} L_{Total}$ (where $L_{total}$ is the thickness of just the active material) and is defined in F. Mok et. al. *Optics Letters* 21(12), p. 896 (1996). A {M} number less than 10 yields a substantially decreased diffraction efficiency for a large number (greater than 1,000) of overlapped holograms and, therefore, results in a substantially reduced intensity of reconstruction and limits the information storage density. Generally, the number of active layers of a given material determines the amount of information that ultimately can be stored and reconstructed. However, the greater the number of layers, generally the greater the cost and/or difficulty of manufacturing. Therefore, typically, it is desirable to limit the number of layers provided the total storage amount desired for a particular application is achievable using the intended number of alternating layers. (The thickness of each active region need not be precisely the same provided the median thickness satisfies the criteria discussed above.)

The selectivity, as measured in the X direction (in the plane of intersection of the two beams) is not necessarily the same as measured in the Y direction. For purposes of determining whether the selectivity satisfies the desired criterion relative to thickness variation measurement in the X direction is employed. Exemplary of recordation methods when employed with a stratified medium that yields the desired inventive result are those described in co-pending U.S. patent application Ser. No. 08/435,705, filed May 5. 1995 (Curtis-Wilson 2-6) now , U.S. Pat. No. 5,719,691, which has been incorporated by reference herein.

The following examples are illustrative of the invention.

EXAMPLE 1

Figure 2:
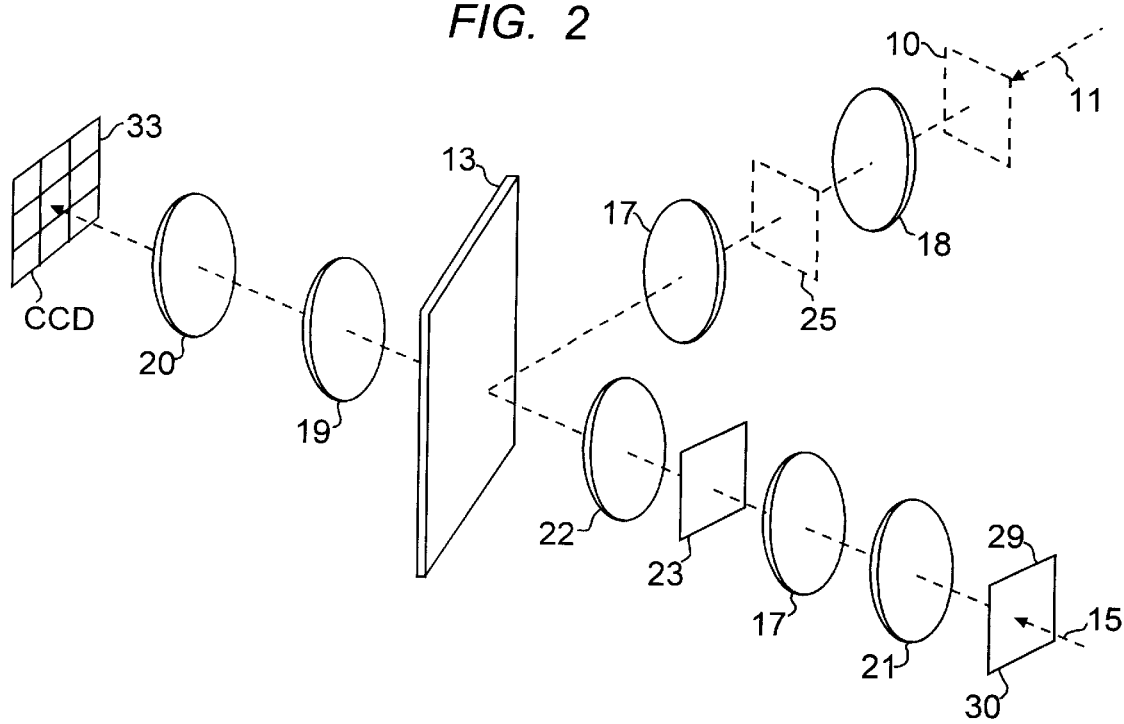
FIG. 2 is illustrative of an apparatus useful in practicing the invention.

The apparatus shown in FIG. 2 was employed. The angle between the object beam, 15, and the reference beam, 11, was maintained at 70 degrees. The power at the sample of the object and reference beam was 1 mW each. The beam spot size was approximately 5 mm in diameter. Each beam had but one polarization, and the polarizations of the two beams were both horizontal in direction. A doubled neodymium YAG diode pumped laser (532 nm) was used as the source for the reference beams, 11, and object beam, 15. The two beams were generated using a beam splitter. The coherence of the beams was approximately 1 meter. The reference beam was directed to a spatial filter which included a microscope objective (60×) and a pinhole approximately 10 μm in diameter. The beam was then collimated by passing it through an 85 mm focal length f1.4 Nikon camera lens. The resulting planewave, 11, was then passed through a phasemask, 10. This mask was a pixelated array having square abutting pixels. The gross dimension of the mask was 2 cm on a side, and the size of the pixels varied, but all pixels in a column were of the same size. The pixels forming a column along one edge of the mask were all 5 μm in dimension. The size of the pixels decreased linearly to a pixel of approximately 5 μm situated in the center column of the mask. From this pixel, moving outward, the dimensions of pixels in each column increased linearly until the column of pixels on the opposing side of the mask was reached, which also had a dimension of 15 μm. Approximately a million pixels were present on the mask. The phaseshift induced by each pixel was set by etching each pixel to a depth adequate to produce the desired phase shift. The phaseshift of each pixel was randomly chosen, but phaseshifts of zero and π were the only levels of phaseshift employed.

The beam exiting the phasemask was then directed through two lenses, 17 and 18, to reimage the mask on the material. The two lenses employed were a 180 mm f2.8 Nikon camera lens and a 90 mm f1.80 Nikon camera lens. The 180 mm lens intercepted the beam first. The distance between the two lenses were adjusted by directing a planewave through the first lens and adjusting the spacing until a planewave exited the second. A glass plate, 25, with a chromium layer measuring 1 cm on each edge positioned centrally, was inserted at the Fourier plane between the lenses and positioned using XY stages to block most of the zero$^{th}$ order which contains the low frequency components of the resulting Fourier transform as well as correcting, at least in part, for phase errors in the mask. The image exiting the 90 mm lens was impinged on the sample that was placed approximately at the focal distance of the 90 mm lens. The sample beam was produced by illuminating a modulator, 29 with a planewave 15, and the image was a checkerboard pattern of 640×480 pixels. The pixel size was approximately 42 μm. A phase diffuser, 23, was employed in the object arm. This phase diffuser was approximately 1"×1¼" in dimension having 42 μm square pixels and employing an array measuring 640×480 pixels. (This diffuse was optional but was employed to diffuse the light energy at the sample and, thus, produce a higher quality image upon reconstruction.) Other lens employed were 21, 40, and 22 which were used to image the modulator 29 onto the phasemask 23 and Fourier transform the result onto the medium 13.

Imaging the reconstruction was done employing a 85 mm f1.4 Nikon lens, 19, to produce an inverse Fourier transform with detection employing a Princeton Instruments Scientific charge couple device detector. Additionally, a second lens, 20, was employed between the inverse Fourier transform lens and the detector, 33, to control the size of the image at the detector. The distance between the sample and the lens was approximately 90 mm. The position of the detector was adjusted so that the portion of the image of interest fit within the field of the detector. Intensity of the reconstructed image was measured utilizing a Newport Research 1835 Intensity detector which integrated the intensity present at the reconstruction plane.

The image was written in a sample with alternating glass regions and polymer regions. This stratified medium is described in U.S. patent application Ser. No. 08/698,143 filed Aug. 15, 1996 (V. L. Colvin 1-2-16-10, ), which is hereby incorporated by reference. Briefly, the sample included either 2, 3, or 4 glass regions measuring each approximately 150 μm in thickness and having an outside dimension of approximately 1½"×2 to 3". The polymer employed had an isobornyl acrylate-polytetrahydrofuran diurethane diacrylate matrix with n-vinyl carbazole distributed in the matrix. The mole percentage of n-vinyl carbazole, relative to total acrylate, was approximately 25%. Sufficient amount of the polymer was poured between slides to produce a polymer covered region approximately 100–150 μm in thickness with an irregular outside dimension approximately 1½" in diameter. (The thickness was measured using interferometry and/or infrared spectroscopy.) Each polymer region was cured to about 80% using a Mercury lamp and a filter passing only green light. The level of cure was determined by employing infrared spectrometry to measure the amount of acrylate remaining after curing.

Recording was done utilizing the above-described apparatus and sample with a recording time of approximately 1 second. After recordation, the samples were postcured for 5 minutes using a filtered Mercury lamp (curing wavelength approximately 560 nm). This further curing was performed to ensure that the samples were inactive and that additional recording did not occur.

The recorded images were reconstructed again using the apparatus described above, and shown in FIG. 2. The selectivity achieved in this Example was approximately 5 μm.

EXAMPLE 2

The procedure of Example 1 was employed, except the samples were iron doped (0.05% concentration) lithium niobate. Lithium niobate samples were either 500 μm or 1 mm in thickness, and were cleaved and polished with the c-axis laying in the plane of the material and along the plane of intersection of the beams. They measured approximately 25×35 mm. A microscope slide approximately 1 mm in thickness was inserted between two of the lithium niobate crystals. The recordation process of Example 1 was employed, except the exposure time was approximately 20 minutes. The resulting reconstructed image showed a selective of about 5 μm.

The invention claimed is:

1. A process for recording multiple holograms in a holographic recording medium in which an array of individual partially overlapping holograms is recorded in the recording medium, the process comprising recording each individual hologram at an individual location by interfering a reference beam and a signal beam, and by moving the medium and the beams relative to each other to locate each individual hologram, the reference beam as measured at the position of interference comprising a phase beam of unchanging content containing a multiplicity of rays of non-uniform angle of incidence and of non-uniform phase, the reference beam further having a position-to-position self-similarity such that its auto-correlation function has a value which is sufficiently small to enable selection of individual holograms of the array, the process characterized in that the recording medium comprises a multiplicity of layers at least two of said layers are active layers that comprise material sensitive to said interfering reference beam and signal beam, said active layers separated in the propagation direction of the reference beam by a region comprising a layer that is inactive such that the ratio of the average thickness of the active layer to the thickness of the inactive layer is smaller than 10:1.

2. The process of claim 1 wherein said active area comprises a photorefractive material.

3. The process of claim 1 wherein said active area comprises a material that is induced to polymerize upon radiation.

4. The process of claim 3 wherein said monomer undergoes a photo-induced polymerization.

5. This process of claim 3 wherein said material comprises a polymer material having a monomer distributed in said matrix.

6. The process of claim 1 wherein said active area comprises a photochromic material.

7. The process of claim 1 wherein said active area comprises a monomer sensitive to said signal light.

8. The process of claim 1 wherein said inactive area comprises glass.

9. The process of claim 1 wherein inactive area comprises polymer material.

10. The process of claim 1 wherein said medium includes a substrate.

11. The process of claim 1 wherein said technique for providing selectivity is correlation multiplex holography.

12. A stratified medium having regions with a multiplicity of patterns of variation constituting a multiplicity of stored holograms, said patterns produced by a first interaction of signal light and reference light followed by subsequent interactions of a signal light and said reference light wherein said stratified medium comprises at least two layers each containing said patterns separated by a layer essentially without patterns wherein the ratio of the average thickness of said layer with said patterns to the thickness of said layer without patterns is smaller than 10:1 and wherein said multiplicity of patterns are reconstructable individually by the process comprising illumination with a readout beam which is successively positioned by movement of the beam and the stratified medium relative to each other in order to locate each hologram, the readout beam, as measured at the medium, being a phase beam of unchanging content containing a multiplicity of rays of non-uniform angle of incidence and of non-uniform phase, the readout beam further having a position-to position self-similarity such that its auto correlation function has a value which is sufficiently small to enable selection of individual holograms.

13. The medium of claim 12 wherein said layer with patterns comprises a polymer.

14. The medium of claim 12 wherein said layer with patterns comprises a photo-induced polymerization polymer.

15. The medium of claim 12 wherein said layer with patterns comprises a photorefractive material.

16. The medium of claim 12 wherein said pattern is formed by correlation multiplex holography.

* * * * *